Patented Mar. 10, 1931

1,795,658

UNITED STATES PATENT OFFICE

BASILIUS RECTE VASO MALENKOVIĆ, OF NEULENGBACH, LOWER AUSTRIA, AUSTRIA

COMPOUND ADAPTED FOR THE PRESERVATION OF WOOD

No Drawing. Original application filed December 16, 1925, Serial No. 75,870, and in the Netherlands and Switzerland December 3, 1926. Divided and this application filed November 15, 1927. Serial No. 233,520.

The present invention relates to new chemical compounds which are formed when non-methylated primary aromatic amines act upon the halogen-dinitro-derivatives of benzol or its homologues. The new chemical compounds thus obtained are suitable for the preservation of wood. Since the substances first formed in this reaction are not described in the literature of the subject, it is necessary to explain their nature by an example.

If equimolecular quantities of $\alpha$-naphthylamine in the form of a saturated alcoholic solution thereof, which will be colourless, provided the preparation is pure, and a chlorodinitrobenzol, for example, 2.4-dinitro-1-chlorobenzol, also in the form of a saturated alcoholic solution, are mixed, the mixture immediately becomes blood red and crystals—vermilion to blood red in colour—forming the sole reaction product.separate out. The reaction therefore is a simple accretion of the components. No free hydrochloric acid can be detected. The empirical formula of this compound is $C_{10}H_7NH_2.C_6H_3(NO_2)_2Cl$ and it may be regarded either as a derivative of dihydrobenzol, $C_6H_8$, as represented by the formula (A) or as a compound of pentavalent nitrogen derived from ammonium chloride, $NH_4Cl$, as represented by the formula (B).

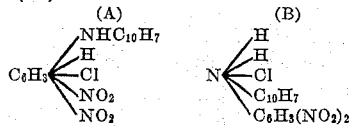

According to the second hypothesis, therefore, an ammonium base is formed, as in the case of aliphatic compounds. Instead of mixing solutions of the two components it is even sufficient to fuse a mixture of them; in fact, simple intimate trituration in a mortar is enough. The $\alpha$-naphthylamine may be replaced by $\beta$-naphthylamine, aniline, one of the toluidines, xylidines or by one of the anthramines; in short, any primary aromatic amine will react in the same manner. The chlorodinitrobenzol may be replaced by chlorodinitrotoluol or by chlorodinitroxylols. The chlorodinitro compounds might also be replaced by the corresponding bromine and iodine compounds but there would be no advantage in using these since they are far more expensive than the chlorine compounds. No matter what combination of components be taken the reaction product is always vermilion to blood red in colour. Examination under the microscope reveals yellowish red, brown-red, vermilion or blood-red needles.

These compounds are not identical with the corresponding secondary amines but can all be transformed into the corresponding secondary amines by the elimination of HCl, HBr or HI as the case may be. In appearance the secondary amines are the same as the compounds first formed except that they are often somewhat darker. The melting point of the corresponding secondary amines, however, is considerably higher. For example, the substance obtained from mixtures of $\alpha$-naphthylamine and chlorodinitrobenzol melts below 100° C., whereas the dinitrophenyl-$\alpha$-naphthylamine obtained therefrom does not melt below 190.5° C.

In order to transform the substances first formed into the corresponding secondary amines solutions of the same must be boiled for a long time in presence of substances which split off halogen acids. The following equations illustrate the conversion:

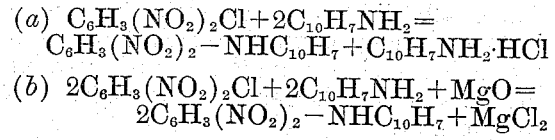

The boiling is therefore conducted in presence of an excess of the primary amine or else a neutralizing agent such as magnesia, zinc oxide, sodium acetate, etc., is used.

If the agents splitting off hydrogen, that is to say the oxidizing agents, be allowed to act still longer carbazoles may be formed. The formation of carbazoles is not desired and should be avoided by limiting the oxidizing action.

The substances first formed are not described in chemical textbooks, though descriptions are given of the secondary amines preparable therefrom.

Experiments have shown that, so far as fungicidal properties are concerned, it is immaterial whether use is made of the initial products obtained by simply mixing, fusing or triturating the components or the products—that is the secondary amines—obtained therefrom by subsequent expulsion of acid.

On the other hand the selection of the primary materials is by no means immaterial; the degree of activity apart from the cost being the first consideration. It has been found, for example, that the action of the compounds obtained from α-naphthylamine and chlorodinitrobenzol is at least twice as powerful as those from aniline and chlorodinitrobenzol. The halogendinitro compounds, i. e. chlorodinitrobenzol, the chlorodinitrotoluols and chlorodinitroxylols as also the corresponding bromine or iodine compounds cannot be replaced by the corresponding naphthalene or anthracene derivatives.

Only one of the two nuclei, namely that of the benzol or of the toluol or xylol, may be nitrated and that nucleus must contain two nitro groups and not one or three. The second nucleus, namely that of the primary amine, whether a benzol, toluol, xylol, naphthalene, anthracene, or a still more complex nucleus, must not contain any nitro group at all. In German Patent 219,942, I have specified the symmetrical tetranitrodiphenylamine $(C_6H_3(NO_2)_2)_2NH$ as being active. Here the second benzol nucleus also is nitrated, and this substance is therefore far weaker in action than those now specified. Moreover, the said patent relates solely to nuclei and derivatives of benzol and its homologues. Again, dinitrobenzol and its homologues such as dinitrotoluol form, with aniline, naphthylamine, etc., red needles having the empirical formula, $C_6H_4(NO_2)_2.C_{10}H_7NH_2$.

These substances, however, only act with the same power as a mixture of their components and cannot be transformed into the secondary amines. The case, however, is fundamentally different when, as in the present instance, halogendinitrobenzols are employed. As shown in the following table the activity then largely exceeds that of the components:

| Substance | The addition of the following percentages prevents the growth of Penicillium and all other fungi on saccharose-gelatine, the surface therefore remaining sterile |
|---|---|
| Dinitrobenzol | 0.050 |
| Dinitrotoluol | 0.045 |
| Chlorodinitrobenzol | 0.050 |
| Aniline | 0.600 |
| α-naphthylamine | 0.100 |
| β-naphthylamine | 0.150 |
| Diphenylamine | 0.500 |
| Dinitrophenol | 0.060 |
| Dinitro-o-cresol | 0.040 |
| Compounds obtained from molecular mixtures of chlorodinitrobenzol and aniline | 0.020 |
| Compounds obtained from molecular mixtures of chlorodinitrobenzol and α-naphthylamine | About 0.010 |

Hence the compounds obtained from chlorodinitrobenzol and α-naphthylamine act with approximately five times as much energy as one of the components,—chlorodinitrobenzol, or as dinitrobenzol, and about ten times as strongly as the second component,—α-naphthylamine. They far exceed the activity of the substances I described in German Patent 219,942. The action of the substances obtained from α-naphthylamine and chlorodinitrobenzol is six times greater than that of the dinitrophenol so largely employed for the purpose of preserving wood. All the substances resulting from halogendinitrobenzol derivatives and primary amines are very sparingly soluble in water. If used in the form of aqueous solutions, the best method is to mix with them the solutions of other impregnating agents, such as zinc chloride, alkali fluorides or mixtures of alkali fluorides with dinitrophenol salts.

It is preferable to use oil as the solvent for the original materials mixed in molecular proportions or the products obtained by fusion or trituration or even for the corresponding secondary amine. All the usual oils are suitable; coal tar oils, brown-coal tar oils, water-gas tar oils, mineral oils, etc. The wood may also be first impregnated with a solution of these substances in oil and then with water alone to ensure better distribution of the oil or with alkali metal-fluorides, with or without addition of salts of the dinitrophenols, or with zinc chloride.

Of the compounds resulting from α-naphthylamine and chlorodinitrobenzene, 0.25 kg. per cubic metre of wood will be sufficient, though, for the sake of precaution, a larger amount may be used. If other substances be added, quantities below 0.25 kg. per cubic metre of wood will suffice to produce the full effect.

What I claim is:—

As a new product an addition compound of 2.4.dinitro-1-chlorobenzol and α-naphthylamine, being a stable crystalline body.

In testimony whereof I have hereunto set my hand.

BASILIUS RECTE VASO MALENKOVIĆ.